UNITED STATES PATENT OFFICE.

MARC DARRIN, OF WILKINSBURG, PENNSYLVANIA, ASSIGNOR TO H. KOPPERS COMPANY, OF PITTSBURGH, PENNSYLVANIA, A CORPORATION OF PENNSYLVANIA.

METHOD OF RECOVERING RESINS FROM BENZOL-PLANT RESIDUES.

1,236,917.     Specification of Letters Patent.     Patented Aug. 14, 1917.

No Drawing.     Application filed December 30, 1916. Serial No. 139,862.

*To all whom it may concern:*

Be it known that I, MARC DARRIN, a citizen of the United States, residing at Wilkinsburg, Allegheny county, Pennsylvania, have invented a new and useful Method of Recovering Resins from Benzol-Plant Residues, of which the following is a full, clear, and exact description.

My invention relates to the recovery of useful resins from the by-products resulting from the recovery of benzol from gas or tar.

In obtaining benzol from by-product coke ovens, for example, the gases from the coke ovens are passed through a tower where the benzol hydrocarbons are absorbed in a heavy petroleum oil. This petroleum oil is then taken off and distilled to obtain said hydrocarbons in the form of an oil, technically termed light oil, this oil containing a large percentage of benzol. The light oil is then distilled to obtain the benzol content and other constituents, such as toluol. This distillation of the light oil produces residues of variable composition. These residues have heretofore been thrown away. There are also residues recovered from the tower or scrubber where the gases pass in contact with the petroleum oil, these also being discarded.

I have discovered a process for recovering commercially useful resins from these residues and have thus overcome the difficulty heretofore experienced in attempting to utilize them.

My process produces resins of good uniformity from a wide variety of these benzol plant residues, and by suitable variation of my treatment, resins of different melting points may be obtained—up to resins having a melting point of 115 degrees centigrade.

My invention consists essentially in dissolving these residues in a suitable solvent or combination of solvents and then distilling the solution until the temperature of the vapors passing off reaches a certain point which depends upon the nature of the solvent and the consistency of the desired resin product. As a solvent I prefer to use resin naphtha, though other hydrocarbon solvent naphtha, though other hydrocarbon oils or solvents may be used which are capable of dissolving the residues without affecting the essence of the invention. After the solution is formed it is subjected to distillation until the temperature of the vapors passing off is between 150 and 300 degrees centigrade, the lower the temperature of these vapors, the softer is the grade of resin produced. Different grades of resin may thus be produced by carrying the distillation to a higher or lower vapor temperature.

In this distillation the solvent, together with some of the oily matters contained in the residues pass off and are condensed, and part or all of the solvent can be re-used for distilling further residues.

As soon as the temperature of the vapor has reached the desired point for producing the desired grade of resin, steam, air or a gaseous fluid is blown through the liquid solution in the still, and sufficient heat is preferably applied to maintain the solution at approximately the same temperature.

This step of blowing effects additional removal of oily materials, together with naphthalene and similar substances, and is preferably continued until tests of the material remaining in the still show that it has reached the desired consistency. The residual resin thus obtained is then drawn hot from the still and solidified by cooling.

The resin produced by the method of treatment above outlined has a clear yellow or reddish color and is hard and tough and very resistant to the action of acid and alkalis. It is soluble in practically all ordinary organic solvents, except alcohol. The melting point depends upon the temperature of distillation and the duration of the blowing operation. Using low temperatures and short blowing periods, soft resins, of melting point of about 60 degrees centigrade, may be obtained; while by using higher temperatures and prolonging the blowing, materials of melting point of as high as 115 degrees centigrade may be produced.

In treating certain grades of benzol plant residues which are highly contaminated with insoluble foreign substances, it is desirable to filter the solution before the distilling step is carried out in order to filter out this insoluble solid matter. This step is important where the contamination is present, as foreign matter such as free carbon will injure the resulting resin by causing decomposition during distillation, due apparently to catalytic action of the carbon. This filtering is sometimes necessary in using the scrubber residues, although it is not usually necessary in using the residues from the light oil distillation.

Changes may be made in the solvent used, in the vapor temperature employed; and other changes may be made without departing from my invention.

I claim:

1. The method of recovering benzol plant residues, consisting in dissolving the residues, distilling the solution, and blowing a gaseous fluid through the solution.

2. The method of recovering benzol plant residues, consisting in dissolving the same, distilling the solution until the desired vapor temperature is reached, and then blowing a gaseous fluid through the solution.

3. The method of recovering benzol plant residues, consisting in dissolving the same, distilling the solution until the desired vapor temperature is reached, and then blowing a gaseous fluid through the solution, while maintaining the solution at the desired vapor temperature.

4. The method of recovering benzol plant residues, consisting in dissolving the residues in an organic liquid, distilling the same until the desired vapor temperature is reached, and then blowing a gaseous fluid through the solution.

5. The method of recovering benzol plant residues, consisting in dissolving the residues in solvent naphtha, distilling the same until the desired vapor temperature is reached, and then blowing a gaseous fluid through the solution.

6. The method of recovering benzol plant residues, consisting in dissolving the residues, removing insoluble solid matter from the solution, then distilling the solution, and blowing a gaseous fluid through it.

In testimony whereof, I have hereunto set my hand.

MARC DARRIN.

Witnesses:
W. C. LYON,
H. M. CORWIN.